Feb. 23, 1971 J. P. HOBSON 3,565,551
THERMAL TRANSPIRATION VACUUM PUMPS
Filed July 18, 1969 4 Sheets-Sheet 1

INVENTOR
JOHN P. HOBSON
By J. P. Hughes
AGENT

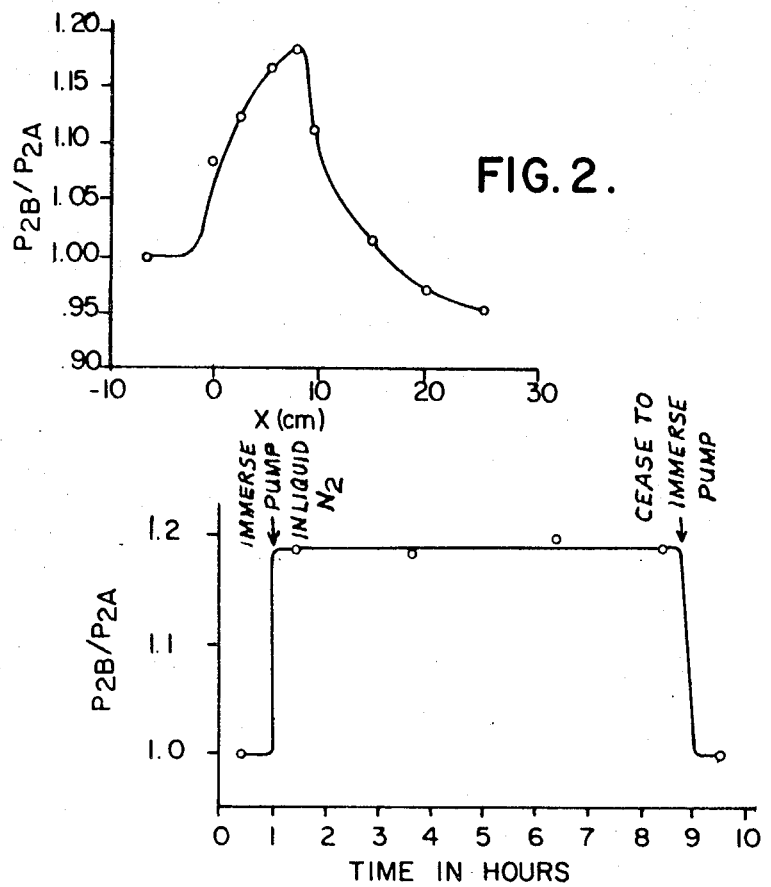
FIG. 2.
FIG. 3.
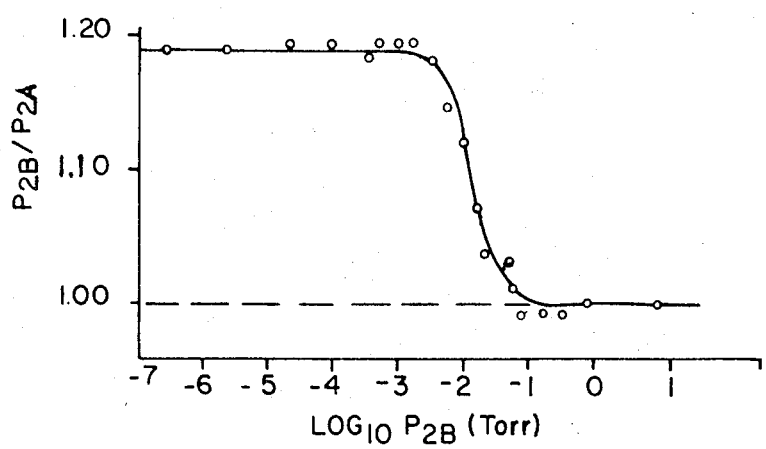
FIG. 4.

United States Patent Office  3,565,551
Patented Feb. 23, 1971

3,565,551
THERMAL TRANSPIRATION VACUUM PUMPS
John Peter Hobson, Ottawa, Ontario, Canada, assignor to Canadian Patents and Development Limited, Ottawa, Ontario, Canada, a corporation of Canada
Filed July 18, 1969, Ser. No. 843,018
Int. Cl. F04b 19/24, 37/06
U.S. Cl. 417—207                6 Claims

ABSTRACT OF THE DISCLOSURE

A thermal transpiration vacuum pump wherein a gas to be pumped is brought into contact along a gas path, with consecutive, gas contacting surfaces. The gas contacting surfaces are alternately atomically rough and atomically smooth, and alternate joined parts of consecutive atomically rough and smooth surfaces are maintained at a first temperature, whilst intermediate parts, disposed between the alternate parts, and comprising joined parts of each atomically smooth and rough surfaces are maintained at a second temperature. This arrangement produces deflections of the gas molecules which are preponderantly more in one direction along the gas path than in the other direction, and so a gas pressure difference is created along the gas path.

---

This invention relates to thermal transpiration vacuum pumps.

A theory of thermal transpiration is already known. If two volumes are connected by a tube the dimensions of which are less than the mean free path of the molecules occupying the two volumes and the tube, and the ends of the connecting tubes are kept at different temperatures, then a pressure differential is set up between the ends of the tube such that the pressure ratio equals the square root of the temperature ratio. This relationship represents the equilibrium condition under which there is no net gas flow along the tube. A kind of thermal transpiration pumping system was built by M. Knudsen (see Ann, Physik 31, 205, 1910) but its use was limited to quite a narrow pressure range. With suitable arrangement of temperatures a thermal transpiration pumping action occurs only when the mean free path, of the gas molecules of the gas to be pumped, lies between the diameter of the bore of the tube and the inside diameter of the two volumes if these are in the form of bulbs or cylinders. With the sizes of the tube bore and bulbs or cylinders limited in this manner the pressure range within which the pump will operate is quite narrow. In fact all of the thermal transpiration pumps which have previously been proposed have this limitation regarding the operating pressure range.

It is one object of the invention to provide a thermal transpiration vacuum pump which will exhaust gases from a volume to a higher vacuum than known types of thermal transpiration vacuum pumps, removing the low pressure limit of such pumps. This is accomplished, as will be described later, by the use of atomically smooth and atomically rough surfaces from which molecules of the gas to be pumped will be deflected in passing along the tube or its equivalent.

A thermal transpiration gas vacuum pump, according to the invention comprises means defining a gas flow path and having a plurality of consecutive gas contacting surfaces disposed along said gas flow path, alternate ones of said surfaces being atomically smooth, the surfaces interposed between said smooth surfaces being atomically rough, and means for maintaining at a first temperature, alternate sections of said surfaces, each said alternate section comprising adjacent joined parts of each said smooth and said rough surfaces, and at a second temperature intermediate sections of said surfaces, each said intermediate section comprising adjacent joined parts of each said rough and said smooth surfaces and being disposed between two said alternate sections, whereby deflections of gas molecules will, when said means for maintaining said first and second temperatures is operative, be preponderantly more in one direction along said gas flow path than in the other direction, and will cause a gas pressure difference between each end thereof.

Figure 1:
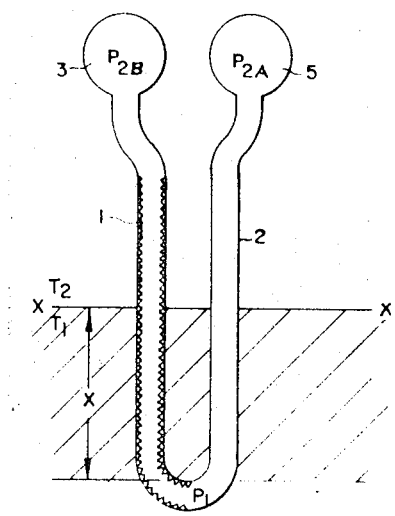
Figure 6:
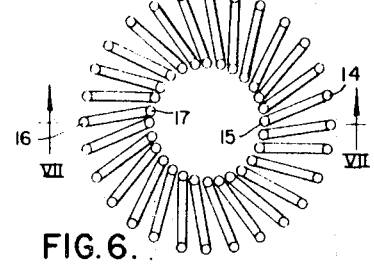
Figure 5:
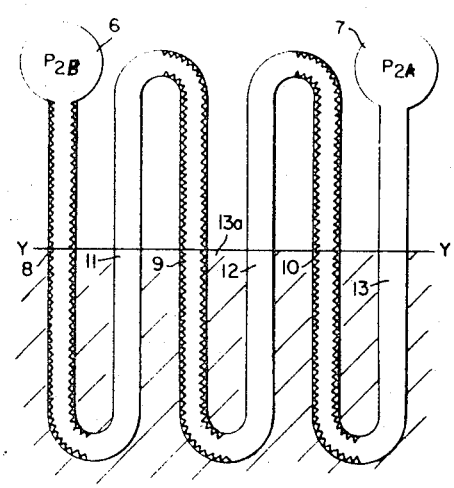
Figure 7:
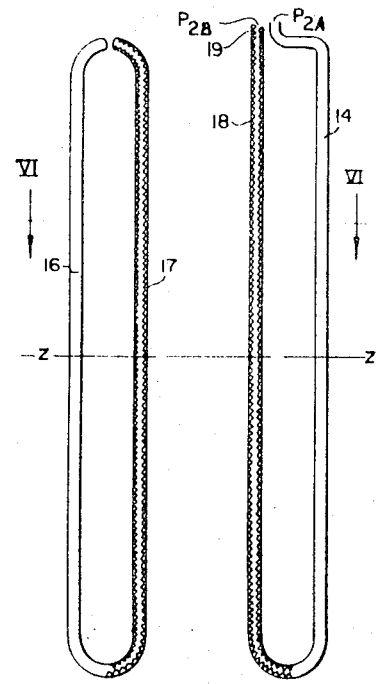
Figure 8:
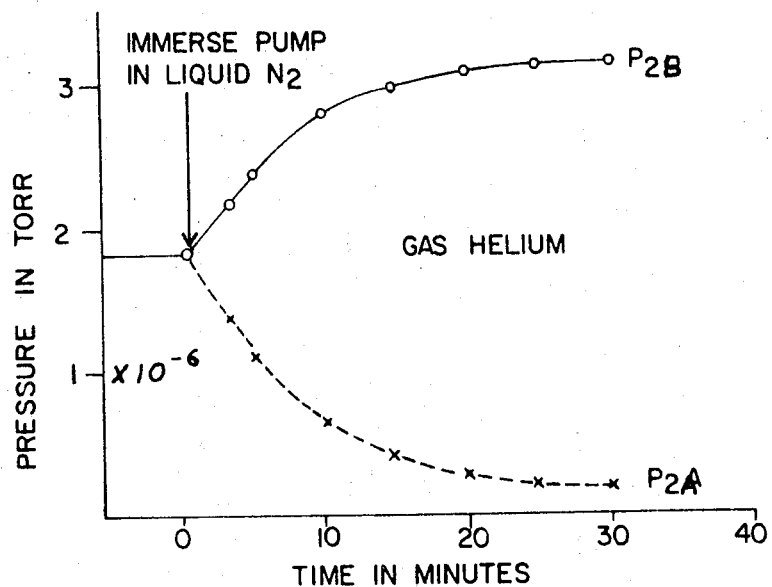

In the accompanying drawings which illustrate the invention, and embodiments thereof by way of example, FIG. 1 is a schematic representation illustrating the principle of a vacuum pump of the invention, FIG. 2 is a graph for $P_{2B}/P_{2A}$ for the pump shown in FIG. 1, for different depths of immersion in liquid nitrogen, FIG. 3 is a graph for the pump shown in FIG. 1 showing the effect of pumping time on the ratio $P_{2B}/P_{2A}$, FIG. 4 is a graph showing the effect of $P_{2B}$ on the ratio $P_{2B}/P_{2A}$, FIG. 5 is a schematic representation of an experimental three stage vacuum pump according to the invention, FIG. 6 is a sectional plan view, along VI—VI FIG. 7, of a twenty-eight stage pump according to the invention, FIG. 7 is a view along VII—VII FIG. 6 showing portions of the tube, FIG. 8 is a graph showing the rates of changes in the values for $P_{2A}$ and $P_{2B}$ from the moment the portion of the pump is immersed in liquid nitrogen.

Figure 12:
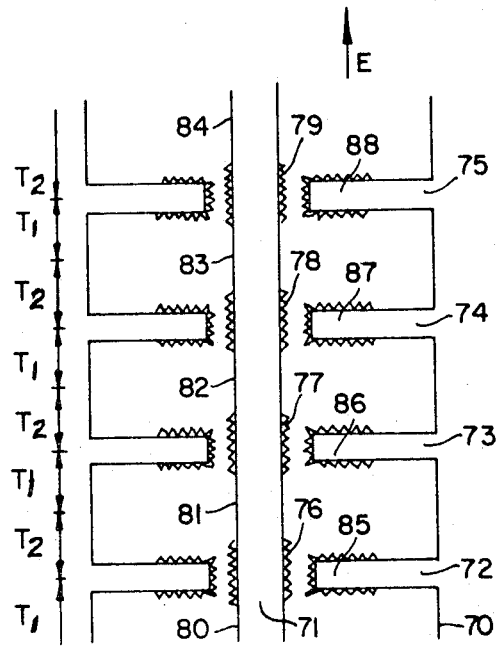
Figure 9:
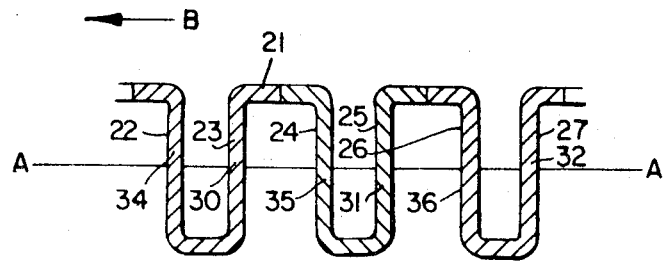
Figure 10:
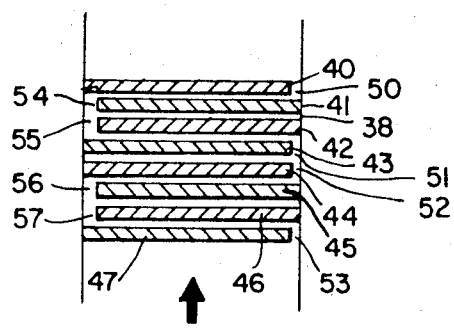
Figure 11:
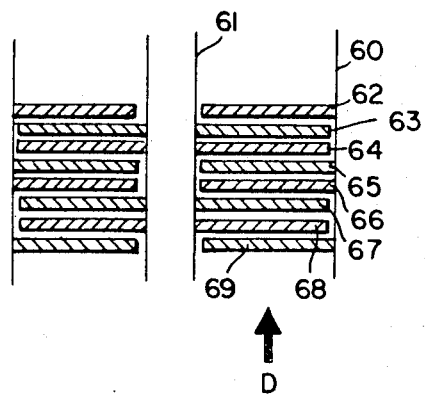

FIG. 9 is a schematic representation of a portion of another pump according to the invention, FIG. 10 is a schematic representation of a portion of a further pump according to the invention, FIG. 11 is a schematic representation of a portion of yet another pump, and FIG. 12 is a schematic representation of a pump of a known type which has been modified to provide a pump according to the invention.

Referring to FIG. 1, there is shown a simple apparatus used by the inventor to verify the principle of the invention. This apparatus comprises 22 mm. inside diameter x 20 cm. long glass tubes 1 and 2 joined together at their lower ends and connecting two glass bulbs 3 and 5 with the apparatus containing helium gas. The apparatus is constructed from essentially a soda-alumina-borosilicate glass having very little alkali and a high silica content. The bore of the tube 1 had been leached for one hundred hours in 0.05 normal hydrochloric acid at 100° C. It should be mentioned that leaching a similar tube for thirty hours showed that the leaching was incomplete. The leaching was carried out before assembling the apparatus by sealing one end of the tube 1, filling it with the hydrochloric acid, and heating the tube 1, with a heater tape along its length. Glass beads were placed in the tube 1 to avoid explosive boiling. After leaching the tube 1 was rinsed in distilled water, dried in air, and the sealed end was cut off.

The apparatus was then assembled as shown in FIG. 1 by a glass blower who was unable to distinguish the leached tube 1, from the unleached tube 2. It was then exhausted to a low pressure and filled with helium gas. The apparatus was then immersed to the depth XX in liquid nitrogen.

In the previous experimental studies on thermal transpiration using ultra high vacuum techniques two glass bulbs were joined by an unbleached glass tube, all of the same material as the above apparatus and it was established by the inventor and Mr. T. Edmonds (Journal of Vacuum Science and Technology 2, 182, 1965) that with the system containing helium the equilibrium pressures $P_1$ and $P_2$, where $P_2$ is the pressure in the other bulb at room temperature, were related by $$\frac{P_1}{P_2} = \frac{"a"(T_1)^{1/2}}{(T_2)} \qquad (1)$$

$T_1$ and $T_2$ being the temperatures in °K, at the pressures $P_1$ and $P_2$ respectively.

Where $"a">1$, if $T_2>T_1$ then $"a"$ was found to lie between 1.04 and 1.30 for helium gas. The experiments were repeated using neon gas and similar results were obtained using the same type of apparatus containing neon.

The above results were of interest because as far as the inventor was aware it was universally assumed that $"a"=1$ when the gas pressure was low enough to ensure that the mean free path for the gas molecules was large compared to the dimensions of the apparatus.

Further experimental work by the inventor showed surprisingly that $"a"$ was substantially equal to unity when the internal surface of the glass tube joining the two bulbs was leached, thus $$\frac{P_1}{P_2} = \frac{(T_1)^{1/2}}{(T_2)} \qquad (2)$$

for a leached tube.

The reason for this difference is possibly due to the different deflection of gas molecules by an atomically roughened (leached) glass surface and an atomically smooth (unleached) glass surface, that is the atomically smooth (unleached) surface probably gives specular reflections of gas molecules and the atomically roughened surface probably gives diffuse reflections of gas molecules.

Returning now to the apparatus shown in FIG. 1, with joined portions of the tubes 1 and 2 immersed in liquid nitrogen to the depth "x" of the dash line XX, the Equations 1 and 2 predict that:

$$\frac{P_1}{P_{2A}} = \frac{"a"(T_1)^{1/2}}{(T_2)} \qquad (3)$$

and $$\frac{P_1}{P_{2B}} = \frac{(T_1)^{1/2}}{(T_2)} \qquad (4)$$

where $T_1$ and $T_2$ are the temperatures below and above the dash line XX respectively, as indicated, and the pressures $P_1$ $P_{2A}$ and $P_{2B}$ are the pressures where indicated in FIG. 1. Dividing Equation 3 by Equation 4 yields $$\frac{P_{2B}}{P_{2A}} = "a" \qquad (5)$$

Since $"a"$ is generally greater than 1, Equation 5 predicts that the gas in the two bulbs 3 and 5 at temperature $T_2$ will arrive at different equilibrium pressures, that the cooling of the gas in the portions of the tubes 1 and 2 immersed in the liquid nitrogen will transfer a mass of gas from the bulb 5 to the bulb 3.

This principle has been verified experimentally using the apparatus shown in FIG. 1 and is the function of the vacuum pump of the invention.

In FIG. 2 there is shown a graph where $P_{2B}/P_{2A}$ for helium is plotted for various dimensions for $x$ (FIG. 1). The helium gas pressure range was $2 \times 10^{-6}$ torr with $T_2$ at room temperature. The coolant used was liquid nitrogen and the depth $x$ of the tubes 1 and 2 in the liquid nitrogen is shown to have an optimum value for the largest $P_{2B}/P_{2A}$ ratio.

In FIG. 3 the same conditions were used as for FIG. 2 except that the depth $x$ was maintained at the optimum value for a number of hours. It will be seen from this graph that the pumping effect is maintained irrespective of the pumping time that has elapsed.

In FIG. 4 the helium gas pressure range was varied using the same other conditions for the experiment as those used in FIG. 3. The results for $P_{2B}/P_{2A}$ were plotted against $\log_{10} P_{2B}$, and the effect on the ratio of $P_{2B}/P_{2A}$ is shown when $P_{2B}$ is changed.

Since the phenomenon described above occurs primarily in the region where the mean free path for the gas molecules is long, the vacuum pumps of the invention are of most use at low pressures, in say the region $10^{-3}$ torr and below, and there appears to be no lower limit in gas pressure for this type of vacuum pump. The upper pressure limit for the pumping action is determined by physical dimensions of the gas passages in the region of the temperature gradient. There is no reason in principle why the upper pressure limit could not be raised toward atmospheric pressure by the use of gas passages filled with microporous solids, such as molecular sieves.

In the tests carried out using helium gas the pressure range of about $10^{-7}$ torr was used with $T_2$ at room temperature, obviously $T_2$ may be above room temperature if desired. The temperature $T_1$ of liquid nitrogen was 77° K. Lower temperatures might also be used.

A simple extension of the principle leading to Equation 5 yields the conclusion that if $n$ stages of the pump are connected in series flow for the gas, that is, each stage comprises a smooth bored portion 2 and a leached bore portion 1 in series then:

$$\frac{P_{2B}}{P_{2A}} = ("a")n \qquad (6)$$

where $n$ is the number of stages.

The apparatus shown in FIG. 5 was constructed of the same glass as the apparatus shown in FIG. 1, with the bulbs 6 and 7 being the equivalent of the bulbs 3 and 5 respectively. The internal surfaces of the tubes 8 and 9 and 10 were leached by the same process as the internal surfaces of the tube 1 (FIG. 1) whilst the internal surfaces of the tubes 11, 12 and 13 were unleached. Thus the apparatus shown in FIG. 5 formed a three stage vacuum pump with the tubes 8 and 11, 9 and 12, and 10 and 13 each forming a stage, and together forming a gas conveying passage which follows a serpentine path.

The apparatus shown in FIG. 5 was constructed and tested using liquid nitrogen 13a to the level YY, for each of the gases helium, neon, argon, krypton and xenon, and all of these gases satisfied Equation 6. The tests revealed for this apparatus a ratio $P_{2B}/P_{2A}$ for each of these gases as follows: helium 2.1, neon 2.0, argon 1.2, krypton 1.17, and xenon 1.15.

Thus, for the embodiment shown in FIG. 5, the thermal transpiration gas vacuum pump, according to the invention, comprises means in the form of tubes 8 to 13 defining a gas flow path and having a plurality of consecutive gas contacting surfaces disposed along the gas flow path. Alternate ones of the surfaces, that is those formed by the surfaces of tubes 11 to 13, being atomically smooth. The interposed surfaces that is those formed by the surfaces of tubes 8 to 10, being atomically rough. Means, in the form of liquid nitrogen 13a, for maintaining at a first temperature alternate sections of the surfaces, each of the alternate sections comprising adjacent joined parts of each of said smooth and said rough surfaces, that is the parts on the portions of tubes 8 to 13 immersed in the liquid nitrogen 13a, and at a second temperature intermediate sections of said surfaces, each of the intermediate sections comprising adjacent joined parts of each of said rough and said smooth surfaces, that is the parts on the portions of tubes 8 to 13 above the level YY of the liquid nitrogen 13a, and which are disposed between the above mentioned alternate sections. Thus deflections of gas molecules will, when the tubes are immersed in the liquid nitrogen 13a as shown, be preponderantly more in one direction along the gas flow path than in the other direction, and will cause a gas pressure difference between each end thereof.

As previously stated the reason why the pump can be reduced to the above basis is that hot gas molecules striking a cold atomically smooth surface are probably deflected or rebound in the form of specular reflections therefrom more so than cold gas molecules striking a hot atomically smooth surface whilst gas molecules striking an atomically roughened surface are probably deflected or rebound in the form of a diffuse reflections therefrom. If this is true it explains the predominant movement of gas molecules in a direction along the atomically smooth bore tubes 11, 12 and 13 relative to the movement of gas molecules along the atomically rough bore tubes 8, 9, and 10.

A further test was carried out using the three stage pump shown in FIG. 5 but with $T_2$ at about 600° K. instead of 295° K. With $T_2$ at this temperature the ratio $P_{2B}/P_{2A}$ was found to be 2.5 instead of the previous 2.1. This was a lower ratio than had been anticipated, but showed that the pump ratio depended upon temperature.

In FIGS. 6 and 7 there is shown a twenty-eight stage vacuum pump of the type shown in FIG. 5. The tube lengths start from the upper inlet end of a downwardly extending, smooth bored inlet tube 14, the lower end of the tube 14 is connected to an upwardly extending tube 15 having an atomically roughened inner surface and then continues with alternate downwardly extending, smooth bored tubes, followed by upwardly extending atomically roughened bore tubes, such as 16 and 17, respectively which are arranged in toroidal-like fashion for compactness. The final upwardly extending atomically roughened bore tube 18 extends upwardly at 19 to provide a gas outlet. All told there are twenty-eight downwardly extending smooth bored tubes and twenty-eight upwardly extending atomically roughened bore tubes, with a downwardly extending tube and the upwardly extending tube therefrom each forming a pump stage. Similar tests carried out with this vacuum pump for helium revealed a pump pressure ratio $P_{2B}/P_{2A}$ of twenty-three and for neon a pump pressure ratio of twenty-one.

In all of the tests the highest ratios for $P_{2B}/P_{2A}$ were obtained when the liquid nitrogen level XX was about half way along the straight lengths of the leached tubes, although the level XX when varied was shown not to be very sensitive as far as the pump pressure ratio was concerned.

In FIG. 8 a graph is shown of the changes in $P_{2A}$ and $P_{2B}$ for the pump shown in FIGS. 6 and 7, from the moment this pump is immersed in liquid nitrogen to the level ZZ (FIG. 7). The dashed line is for $P_{2A}$ and the continuous line is for $P_{2B}$. It will be noted that after approximately 30 minutes the pump attained its highest pressure ratio $P_{2B}/P_{2A}$.

Experiments with vacuum pumps of the type shown in FIG. 1, were made with the tubes of Kovar, polished stainless steel, and porous silver. These tests showed that the pumping action was present, but the pressure ratio $P_{2B}/P_{2A}$ was substantially smaller than that obtained with the above mentioned glass.

It was interesting to note that the pumping action with the above mentioned glass tube was not suppressed by the adsorbed layers on the glass surfaces, for example, there was no reduction in the pumping action of helium when approximately a monolayer of xenon had been adsorbed on the internal surfaces of the tubes from a previous test. This result is important as it leads one to expect that the vacuum pumps may be used where mixtures of gases are to be pumped.

The pressure ratios obtainable with the tubes in series flow showed that relatively small pressure ratios were obtainable but that the pressure ratio could be increased with a series of stages, or stages or series thereof in parallel flow.

In FIG. 9 there is shown a tube 21 composed of tube parts 22 to 27. The tube parts 23, 25, and 27 each contain a molecular sieve with atomically smooth surfaces or porous glass or other suitable porous material, for example, porous porcelain, having atomically smooth surfaces, designated 30, 31, and 32 respectively. The tube parts 22, 24, and 26 each contain a molecular sieve with atomically rough surfaces or porous glass or other suitable porous material, for example, porous porcelain, with atomically rough surfaces, designated 34, 35, and 36. This pump, when placed in liquid nitrogen to the level AA, is intended to function in a similar manner to that described with reference to FIG. 5, except that the gas channels are now the pores in the members 30 to 32 and 34 to 36. The gas contacting surfaces are now the surfaces of the members 30 to 32 and 34 to 36, defining the pores in these members. The pumping direction is in the direction of arrow B. The smaller dimensions of the gas passages should permit pumping to higher pressures.

In FIG. 10 there is shown a portion of a pump, comprising a tube 38 with square or rectangular cross-section having molecular sieve or porous glass plates 40 to 47. Plates 40, 43, 44 and 47 are secured to the left hand side of tube 38 and are shaped to provide narrow gaps 50 to 53 respectively on the right hand side. Plates 41, 42, 45 and 46 are secured to the right hand side of tube 38 and are shaped to provide narrow gaps 54, 55, 56, and 57 respectively on the left hand side. The plates 42, 43, 46 and 47 have atomically smooth surfaces, and the plates 40, 41, 44 and 45 have atomically rough surfaces. In operation the right hand half of the tube 38 is cooled. A path is provided beginning at plate 47 in which gas molecules contact first smooth warm surfaces then smooth cooled surfaces 46, then rough cooled surfaces 45, then rough warm surfaces 44 etc. in exactly the sequence described heretofore. The pumping action is thus upward in FIG. 10 in the direction of arrow C. This pump is intended to function in a similar manner to that described with reference to FIG. 9, with the plates 40 to 47 providing the atomically smooth and rough surfaces with alternate pairs at different temperatures.

In FIG. 11 there is shown a similar embodiment to that shown in FIG. 10 except that the tube 60 has a central tube 61, and annular plates 62 to 69 are used. The annular plates 62 to 69 are molecular sieves or porous glass. Annular plates 62, 63, 66 and 67 have atomically rough surfaces, whilst annular plates 64, 65, 68 and 69 have atomically smooth surfaces. The annular plates 62, 65, 66 and 69 are joined to the tube 60 which is warm relative to the tube 61. Thus a path is provided starting with plate 69 in which gas molecules contact first smooth warm surfaces then smooth cooled surfaces 68, then cooled rough surfaces 67, then warm rough surfaces 66 etc.

This pump is intended to function in a similar manner to that described with reference to FIG. 10. The pumping direction is that of the arrow D.

In FIG. 12 there is shown a duct with a rod 71 centrally disposed therein. The duct 70 has annular plates 72 to 75 attached to it. The plates 72 to 75 have narrow annular gaps between them and the rod 71. This construction is described in an article entitled "A Mathematical Analysis of a Thermal Transpiration Vacuum Pump," by D. J. Turner, in volume 16, page 413, 1966. This pump is modified, according to the invention by making atomically rough surfaced bands 76 to 79 around the rod 71, and atomically smooth surfaced bands 80 to 84 which are interposed between the bands 76 to 79. Each of the plates 72 to 75 is provided with an inner annular portion 85 to 88 respectively which has atomically rough surfaces, whilst the remaining portions of the plates 72 to 75 have atomically smooth surfaces. The inner surface of the duct 70 is atomically smooth.

In operation the lengthwise extending portions marked $T_1$ are cooled to provide a temperature difference between these portions and those marked $T_2$. Thus a pressure differential is created along the duct 70 in a similar manner to that created along the tube of the embodiment described with reference to FIG. 5, and gas will flow in the direction of arrow E.

If desired the positions of the atomically rough surfaces may be occupied by the atomically smooth surfaces and vice versa. This arrangement will cause the gas to flow in the opposite direction to that indicated by the arrow E.

Reversal of temperatures in any of the pumps described above will cause reversal of pumping direction.

Desirable features of the pumps are:
(1) There are no moving parts,
(2) There are no lubricating oils or vapours which may contaminate the gas to be pumped,
(3) There may be no electrical connections.

I claim:

1. A thermal transpiration gas vacuum pump, comprising means defining a gas flow path and having a plurality of consecutive gas contacting surfaces, disposed along said gas flow path, alternate ones of said surfaces being atomically smooth, the surfaces interposed between said smooth surfaces being atomically rough, and means for maintaining at a first temperature, alternate sections of said surfaces, each said alternate section comprising adjacent joined parts of each said smooth and said rough surfaces, and at a second temperature intermediate sections of said surfaces, each said intermediate section comprising adjacent joined parts of each said rough and said smooth surfaces and being disposed between two said alternate sections, whereby deflections of gas molecules will, when said means for maintaining said first and second temperatures is operative, be preponderantly more in one direction along said gas flow path than in the other direction, and will cause a gas pressure difference between each end thereof.

2. A vacuum pump according to claim 1, wherein said plurality of gas contacting surfaces are surfaces of portions of said means which define said gas flow path.

3. A vacuum pump according to claim 1, wherein said means having said plurality of gas contacting surfaces comprises a plurality of members disposed within said means defining said gas flow path.

4. A vacuum pump according to claim 1, wherein said means defining a gas flow path is of a soda-alumina-borosilicate glass, said atomically rough gas contacting surfaces comprise leached surfaces of said glass, and said atomically smooth gas contacting surfaces comprise unleached surfaces of said glass.

5. A vacuum pump according to claim 1, wherein said means defining a gas flow path is tube-shaped, and said gas flow path follows a serpentine path.

6. A vacuum pump according to claim 1, wherein said means defining a gas flow path is one of a plurality of similar means each defining a similar gas flow path, the gas flow paths are disposed in parallel flow, and said means for maintaining said first and said second temperatures, when operative, maintains said alternate and intermediate sections of each said means at said first and second temperatures respeceively.

References Cited
UNITED STATES PATENTS

| | | |
|---|---|---|
| 2,985,356 | 2/1955 | Beecher. |
| 3,098,602 | 7/1963 | Torluemke. |
| 3,150,818 | 9/1964 | Schumacher. |
| 2,702,460 | 2/1955 | Gaugler. |

WILLIAM L. FREEH, Primary Examiner

U.S. Cl. X.R.

62—527; 417—53